Dec. 19, 1950     C. D. CHANDLER     2,534,230
CUTTING TOOL
Filed April 11, 1945

Inventor
Cossie D. Chandler
By
Attorneys

Patented Dec. 19, 1950

2,534,230

UNITED STATES PATENT OFFICE 2,534,230

CUTTING TOOL

Cossie D. Chandler, Cincinnati, Ohio

Application April 11, 1945, Serial No. 587,820

1 Claim. (Cl. 29—95)

(Granted under the act of March 3, 1883, as amended April 30, 1928; 370 O. G. 757)

The invention described herein may be manufactured and used by or for the Government for governmental purposes, without payment to me of any royalty.

This invention relates to cutting tools and particularly cutting tools adapted to simultaneously machine two surfaces.

An object of this invention is to provide a cutting tool for simultaneously machining two surfaces.

Another object of this invention is to provide a cutting tool for simultaneously machining two surfaces, each of which may be a plane surface or an arcuate surface.

Another object of this invention is to provide a cutting tool for simultaneously machining two arcuate surfaces of unequal radii.

Another object of this invention is to provide a device of the class herein described comprising interchangeable component parts.

Another object of this invention is to provide a cutting tool for machining a fine edge on relatively soft, malleable metal.

A still further object of this invention is to provide a cutting tool of the class herein described which will be simple and economical in construction, and efficient and durable in use.

The foregoing and other objects of this invention will be more apparent from reading the specification in conjunction with the drawings, forming a part thereof, wherein.

Figure 1:
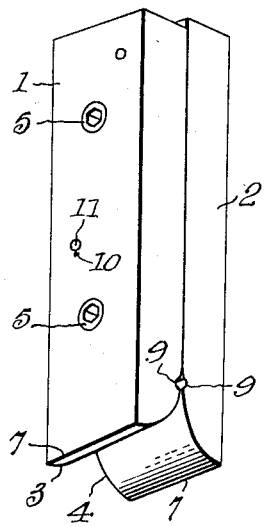
Fig. 1 is a perspective view of one embodiment of the cutting tool assembled.
Figure 2:
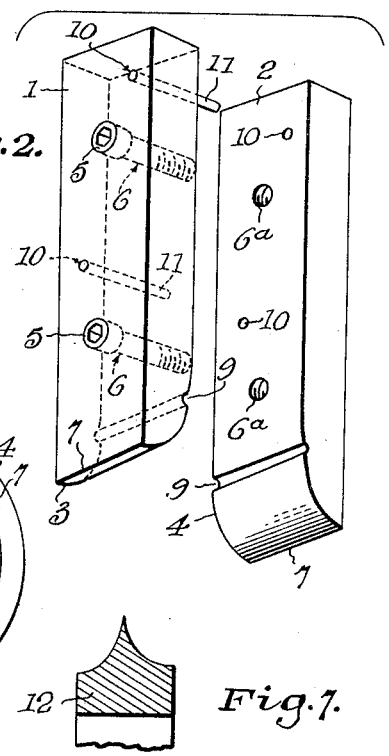
Fig. 2 is a perspective view of the embodiment of Fig. 1 in disassembled condition.
Figure 6:
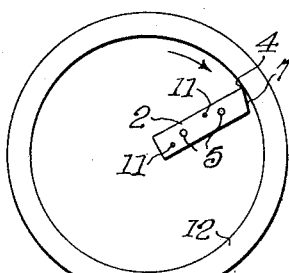
Fig. 6 is a diagrammatic plan view showing the relative positions of the cutting tool and a ring when positioned on a boring mill.
Figure 7:
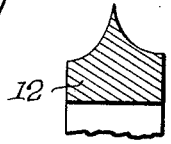
Fig. 7 is a cross sectional view of a ring, machined by the cutting tool, showing the different arcuate surfaces intersecting in a fine line or point.

The embodiment of the invention described hereinafter, and illustrated in the drawings, refers specifically to a cutting tool employed in machining cast bronze rings for search light mirrors. It is to be clearly understood, however, that the invention is not limited to that specific use.

The cutting tool of the invention comprises a pair of body members 1 and 2, having cutting edges 3 and 4 of desired design formed in the respective extremities of the body members. These body members are rigidly secured together with externally threaded fillister cap bolts 5 extending through abutment apertures 6 in a body member 1 and engaging threaded apertures 6a in the other body member 2. The bolt caps are countersunk in the body member thus presenting a smooth surface thereon when the shoulder of the cap and the abutment in the aperture 6 are in contact.

Figure 4:
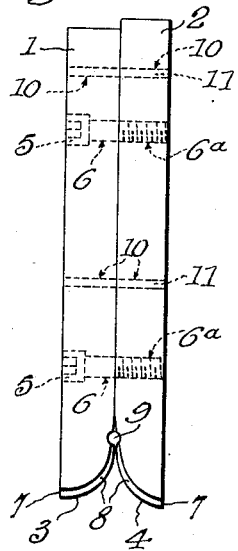
Fig. 4 is a rear end elevation showing the arcuate clearance afforded by the tapering contours of the tool.
Figure 3:
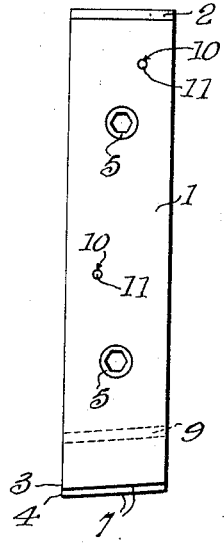
Fig. 3 is a side elevation of the embodiment of Fig. 1 showing the linear clearance angle from the cutting edge.
Figure 5:
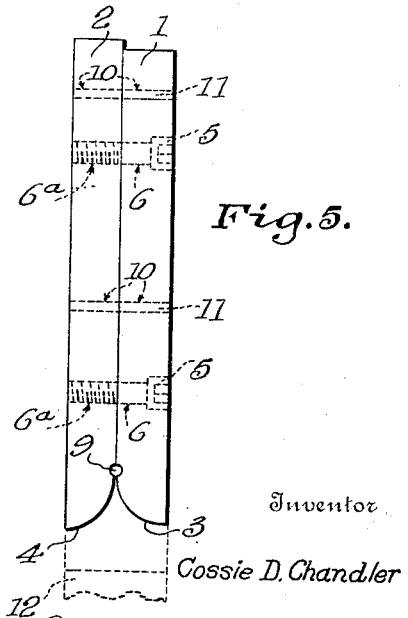
Fig. 5 is a front end elevation showing the cutting edge of the tool with an antifouling groove extending transversely of the tool.

The cutting tool has several clearances or antifouling means to avoid the accumulation of waste material. To avoid accumulation of waste between the body members 1 and 2 and the work 12 being machined, each body member has a wedge cut out to provide a tapering linear surface 7 adjacent the work 12. Starting at the cutting edges 3 and 4 of the body members 1 and 2, the contour of the cutting edge is tapered inwardly with respect to the body member, as illustrated at 8 in Fig. 4, to provide a clearance between the respective body members. When the cutting surfaces intersect to machine a fine edge or point on the work, as they do in the embodiment illustrated in the drawings, it is advisable to provide a transverse groove 9 through the body members at the joinder of the cutting surfaces to avoid accumulation of waste at this point. The substantially circular groove at the junction of the tool's cutting edges 3 and 4 formed in the pair of body members 1 and 2 is a highly important feature of this disclosure. The groove 9 allows a slight degree of flexibility of the cutting edges at their junction that prevents metal particles from building up in the V shaped notch at the junction of the cutting edge. The groove also facilitates the free flow of cutting lubricant along the most critical cutting area. The groove 9 in conjunction with the sectionalized cutting tool produces a smooth apex to the threads cut on a screw, or the like, preventing tearing or burring of the sharp edge of the finished work. It is old in the art to provide a flexible tool or tool carrier in order to produce a smoothly machined surface and numerous patents have been issued covering various embodiments. However, it is new in the art to accomplish such a result in a composite tool in the manner disclosed in this application. The composite sectionalized cutter with the groove 9 provides flexibility and increased lubricating effect contributing substantially to the excellence of the work produced by the cutting tool of this disclosure. In the preferred embodiment of this invention corresponding end portions of each bar are tapered inwardly from the cutting edge from top to bottom of the said end portions. The transverse groove in each bar is substantially circular and it is located inwardly from and adjacent to the cutting edge. Away from the cutting edge the tapered portion is relieved inwardly and transversely to such an extent that the tapering of the cutting tool opens into the transverse groove substantially throughout its length except for a zone or short portion immediately adjacent to the cutting edge. In this restricted portion the hole is physically spaced inwardly from the meeting point of the cutting edge of the bars, and the tapered cutting edge does not physically intersect the arc of the circular groove at this point.

In fabricating the device, the type of materials used and the tolerance between the component parts are extremely important factors. For instance, the body members 1 and 2 must have cutting edges 3 and 4 of high grade steel, and it is preferable to have body members composed of any suitable tool steel. Thus, the cutting edges 3 and 4 ground therein will be sufficiently resistant to abrasion to function in a machining capacity. It is likewise necessary that the bolts 5 and apertures 6 and 6a be properly aligned and snug fitting to insure rigidity of the assembled device and preserve the alignment of the respective cutting surfaces during repeated use. To aid in this alignment and assist in affording a rigidly assembled tool, the aligned apertures 10 are provided in the body members 1 and 2 which are adapted to receive aligning pins 11 forced therein.

The unique design of the cutting tool is such that the body members 1 and 2 may be ground separately to provide cutting surfaces 3 and 4 of any desired design and the two pieces then securely bolted together to form a rigidly assembled device. With this design, it is possible to maintain a collection of individual body members having various designs of cutting surfaces, and to assemble therefrom a cutting tool of a particular design by selecting the appropriate cutting surfaces. Hence, it is possible to provide a device that will simultaneously machine, in one operation, two surfaces regardless of whether these surfaces are straight or have curved contours. Likewise the two surfaces may be simultaneously machined where both have curved contours, but of different radii of curvature, by merely selecting cutting surfaces 3 and 4 having the desired curvature from the collection of body members 1 and 2.

This device also has an advantage over single edged cutting tools employed in machining bronze or other relatively soft metals in that this device supports both sides of the metal during the machining operation. Through this double supporting effect the metal is prevented from rolling over due to its malleability, as it does when machined by a single edged tool. Furthermore, a sharp edge cannot be obtained by employing a single edged tool in machining metals of soft type due to their malleability, but it is easily obtainable, free from burrs and nicks, by employing the device of this invention for such machining processes.

Having thus described my invention, what I claim as new and wish to secure by Letters Patent is:

A cutting tool comprising a pair of elongated bars each having an inner and outer face, means securing the bars together with their inner faces in contact, the end of each bar being tapered inwardly from the junction of its inner and outer face, the taper of each bar extending to the meeting point of the inner faces to form a cutter for cutting fine thread, a hole in the bars spaced inwardly from the meeting point and formed by a groove in each inner face extending transversely thereof, the tapered portion being relieved inwardly and transversely thereof to such an extent that the taper opens into the groove throughout its length except for a zone at the point where the hole is spaced from said meeting point.

COSSIE D. CHANDLER.

REFERENCES CITED

The following references are of record in the file of this patent:

UNITED STATES PATENTS

| Number | Name | Date |
|---|---|---|
| 3,940 | Pierce | Apr. 26, 1870 |
| 294,401 | Meisel | Mar. 4, 1884 |
| 390,982 | Mower | Oct. 9, 1888 |
| 686,687 | Chaffee | Nov. 12, 1901 |

FOREIGN PATENTS

| Number | Country | Date |
|---|---|---|
| 310,372 | Germany | Jan. 16, 1919 |